United States Patent
Roos et al.

(10) Patent No.: US 10,741,302 B2
(45) Date of Patent: Aug. 11, 2020

(54) ELECTRICAL CABLE INCLUDING A CROSSLINKED LAYER

(71) Applicant: NEXANS, Paris (FR)

(72) Inventors: Andreas Roos, Düsseldorf (DE); Bernard Dalbe, Lyons (FR); Jean-François Larche, Fleurieu-sur-Saone (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/312,953

(22) PCT Filed: Apr. 10, 2015

(86) PCT No.: PCT/FR2015/050972
§ 371 (c)(1),
(2) Date: Nov. 21, 2016

(87) PCT Pub. No.: WO2015/177423
PCT Pub. Date: Nov. 26, 2015

(65) Prior Publication Data
US 2017/0194075 A1 Jul. 6, 2017

(30) Foreign Application Priority Data
May 20, 2014 (FR) .................................... 14 54494

(51) Int. Cl.
*H01B 9/02* (2006.01)
*H01B 7/02* (2006.01)
(Continued)

(52) U.S. Cl.
CPC ................ *H01B 7/02* (2013.01); *C08K 5/18* (2013.01); *C08K 5/378* (2013.01); *C08K 13/02* (2013.01); *C08L 23/0815* (2013.01); *C08L 23/16* (2013.01); *H01B 3/441* (2013.01); *H01B 7/282* (2013.01); *H01B 13/14* (2013.01); *Y02A 30/14* (2018.01)

(58) Field of Classification Search
CPC ...................................................... H01B 9/027
USPC .................... 174/110 R, 102 SC, 120 SC
See application file for complete search history.

(56) References Cited

U.S. PATENT DOCUMENTS 4,910,390 A * 3/1990 Barrett .................. H01B 3/445
174/110 FC
6,242,097 B1 * 6/2001 Nishiguchi ............. B32B 27/08
428/383
(Continued)

FOREIGN PATENT DOCUMENTS

CN 103265762 8/2013
CN 103554922 2/2014
(Continued)

OTHER PUBLICATIONS

Search Report dated Jul. 29, 2015.

*Primary Examiner* — Chau N Nguyen
(74) *Attorney, Agent, or Firm* — Sofer & Haroun, LLP

(57) ABSTRACT

An electrical cable (1) includes an elongate electrical conductor (2) surrounded by at least one crosslinked layer (3, 4, 5) obtained from a polymer composition including a polymer material and a protection system. The protection system includes diphenylamine or a diphenylamine derivative and a sulfur compound selected among an organic thiol, a thiolate, and one of the mixtures thereof.

26 Claims, 3 Drawing Sheets

(51) Int. Cl.
*H01B 3/44* (2006.01)
*H01B 7/282* (2006.01)
*C08L 23/16* (2006.01)
*C08K 5/378* (2006.01)
*C08L 23/08* (2006.01)
*C08K 5/18* (2006.01)
*C08K 13/02* (2006.01)
*H01B 13/14* (2006.01)

(56) References Cited

U.S. PATENT DOCUMENTS

| | | | |
|---|---|---|---|
| 7,794,847 B2 * | 9/2010 | Chasey | B29C 47/0016 156/244.11 |
| 2005/0133248 A1 * | 6/2005 | Easter | C08K 5/005 174/137 B |
| 2011/0111153 A1 * | 5/2011 | Russell | B32B 1/08 428/36.9 |
| 2011/0209898 A1 * | 9/2011 | Kibe | H01B 7/2806 174/113 R |
| 2012/0227997 A1 * | 9/2012 | Koelblin | H01B 1/24 174/102 SC |
| 2013/0032376 A1 * | 2/2013 | Fagrell | C08L 23/0846 174/120 SC |
| 2014/0117288 A1 * | 5/2014 | Rebar | G21F 3/025 252/478 |
| 2014/0187685 A1 | 7/2014 | Roos et al. | |
| 2014/0199547 A1 * | 7/2014 | Jamieson | C08F 2/44 428/368 |

FOREIGN PATENT DOCUMENTS

| | | |
|---|---|---|
| JP | 2002256120 | 9/2002 |
| WO | WO 2012/048927 * | 4/2012 |

* cited by examiner

ELECTRICAL CABLE INCLUDING A CROSSLINKED LAYER

RELATED APPLICATION

This application is a National Phase of PCT/FR2015/050972, filed on Apr. 10, 2015 which in turn claims the benefit of priority from French Patent Application 14-54494, filed on May 20, 2014, the entirety of which are incorporated by reference.

BACKGROUND

Field of the Invention

The present invention relates to an electric cable comprising at least one crosslinked polymeric layer. It applies typically but not exclusively to the fields of low-voltage (in particular less than 10 kV), medium-voltage (in particular from 10 to 45-60 kV) or to high-voltage (in particular greater than 60 kV and which can range up to 800 kV) power cables, whether direct current or alternating current.

DESCRIPTION OF RELATED ART

Power cables typically comprise a central electrical conductor and at least one electrically insulating layer crosslinked by techniques well known to a person skilled in the art.

This type of crosslinked layer generally comprises protective agents intended to control and reduce the absorption of water and to guarantee the electrical insulation of the cable over time.

Conventionally, these protective agents can be lead-based compounds, such as lead oxides. However, lead-based compounds are not environmentally friendly.

Objects and Summary

The aim of the present invention is to overcome the disadvantages of the techniques of the prior art by providing an electric cable comprising an environmentally friendly crosslinked layer, while guaranteeing good electrical and mechanical properties throughout the life of the cable.

A subject matter of the present invention is an electric cable comprising an elongated electrical conductor surrounded by at least one crosslinked layer obtained from a polymer composition comprising a polymer material and a protective system, characterized in that the protective system comprises:
  diphenylamine or a diphenylamine derivative, and
  a sulfur-comprising compound chosen from an organic thiol, a thiolate and one of their mixtures.

The invention advantageously presents an environmentally friendly cable, with a protective system not comprising a lead-based compound and in particular not comprising lead oxide. More particularly, the crosslinked layer of the invention does not comprise a lead-based compound and in particular does not comprise lead oxide. Mention may be made, as lead oxide, for example, of PbO and $Pb_3O_4$.

In the present invention, the expression "a protective system or a crosslinked layer not comprising a lead-based compound or lead oxide" is understood to mean a protective system or a polymer composition or a crosslinked layer comprising less than 3% by weight of lead-based compound or of lead oxide, preferably less than 1% by weight of lead-based compound or of lead oxide and particularly preferably 0% by weight of lead-based compound or of lead oxide, with respect to the total weight of the protective system or of the polymer composition or of the crosslinked layer, respectively.

In addition, the crosslinked layer of the invention exhibits very good mechanical and electrical properties, in particular a water absorption (i.e., swelling) and also a permittivity which are significantly limited by virtue of this novel protective system.

More particularly, the crosslinked layer of the invention exhibits a water absorption of at most 0.6 $mg/cm^2$ during immersion in water at 70° C. for 7 days.

The crosslinked layer of the invention exhibits a water absorption of at most 0.9 $mg/cm^2$ during immersion in water at 70° C. for 14 days and preferably a water absorption of at most 0.8 $mg/cm^2$ during immersion in water at 70° C. for 14 days.

The crosslinked layer of the invention exhibits an electric permittivity according to the standard IEC 250 of at most 3.0 at 90° C., after immersion in water at 70° C. for 14 days, and preferably of at most 2.5 at 90° C., after immersion in water at 70° C. for 14 days.

Diphenylamine and the Diphenylamine Derivative

Diphenylamine, or N-phenylaniline, is an amine of empirical formula $C_{12}H_{11}N$.

A diphenylamine derivative can be diphenylamine comprising one or more substituents on at least one of its two aromatic nuclei.

Preferably, the diphenylamine derivative can be chosen from octylated diphenylamine (ODPA), styrenated diphenylamine (SDPA) and one of their mixtures.

In the present invention, a diphenylamine derivative is preferably used in comparison with diphenylamine as said derivative is less volatile than diphenylamine as such.

Diphenylamine or a diphenylamine derivative is added to the polymer composition in an amount sufficient to obtain the desired properties of the invention.

By way of example, the polymer composition can comprise from 0.1 to 5.0 parts by weight of diphenylamine or of diphenylamine derivative per 100 parts by weight of polymer material and preferably from 0.5 to 2.0 parts by weight of diphenylamine or of diphenylamine derivative per 100 parts by weight of polymer material.

The Sulfur-Comprising Compound

The sulfur-comprising compound is chosen from an organic thiol, a thiolate and one of their mixtures.

The organic thiol of the invention can be a compound comprising at least one —SH group.

The thiolate of the invention can be a compound comprising at least one thiolate anion, in particular resulting from the deprotonation of a thiol or resulting from the salt of a thiol. Preferably, the thiolate can be a salt of said organic thiol of the invention.

In some cases, the sulfur-comprising compound of the invention can be both an organic thiol and a thiolate, in particular when the sulfur-comprising compound comprises at least one —SH group and at least one thiolate anion.

According to a first alternative form, the sulfur-comprising compound of organic thiol type can be:
  a monothiol compound, which can be chosen from 2-mercaptopyridine (MPY), 2-mercaptopyrimidine (MPM), 2-mercaptobenzimidazole (MBI), 2-mercaptobenzothiazole (MBT) and their derivatives;
  a dithiol compound, which can be chosen from 2,5-dimercapto-1,3,4-thiadiazole (DMT), 2-mercaptoethyl ether (DME), 2-mercaptoethyl sulfide (DMES) and their derivatives;

a triazinethiol compound, which can be chosen from trithiocyanuric acid (TT), 6-dibutylamino-1,3,5-triazinedithiol (DB), 6-anilino-1,3,5-triazinethiol (AF) and their derivatives.

In a particularly preferred embodiment, the organic thiol is a monothiol compound, in particular chosen from 2-mercaptopyridine (MPY), 2-mercaptopyrimidine (MPM), 2-mercaptobenzimidazole (MBI), 2-mercaptobenzothiazaole (MBT) and their derivatives.

Preferably, the organic thiol of the invention is a benzimidazole derivative and is chosen in particular from mercaptobenzimidazoles and their derivatives.

By way of preferred example, the mercaptobenzimidazoles and their derivatives can be chosen from 2-mercaptobenzimidazole (MBI), the methylated derivatives of 2-mercaptobenzimidazole (MMBI) and one of their mixtures.

According to a second alternative form, the sulfur-comprising compound of the thiolate type can be a salt of one of the organic thiols described in the first alternative form and in particular a zinc salt of one of said organic thiols.

Mention may be made, by way of example, of 2,5-dimercapto-1,3,4-thiadiazole dipotassium salt (DMTN). Thiolates other than those mentioned above can, of course, be used.

According to a third alternative form, the sulfur-comprising compound of the organic thiol and thiolate type can be chosen from trithiocyanuric acid monosodium salt (TTN), 6-dibutylamino-1,3,5-triazinedithiol monosodium salt (DBN) and 6-anilino-1,3,5-triazinethiol monosodium salt (AFN). Sulfur-comprising compounds of the organic thiol and thiolate type other than those mentioned above can, of course, be used.

In the present invention, the type of sulfur-comprising compound preferred is an organic thiol as it makes it possible to optimize the mechanical and electrical properties and exhibits a noteworthy synergy in combination with diphenylamine or a diphenylamine derivative.

The sulfur-comprising compound of the invention is added to the polymer composition in an amount sufficient to obtain the desired properties of the invention.

By way of example, the polymer composition can comprise from 0.1 to 5.0 parts by weight of sulfur-comprising compound per 100 parts by weight of polymer material and preferably from 0.5 to 2.0 parts by weight of sulfur-comprising compound per 100 parts by weight of polymer material.

The Polymer Material

The polymer material of the invention comprises one or more polymer(s), the term polymer being able to be understood by any type of polymer well known to a person skilled in the art, such as homopolymer or copolymer (e.g., block copolymer, random copolymer, terpolymer and the like).

The polymer can be of the thermoplastic or elastomeric type and can be crosslinked by techniques well known to a person skilled in the art.

In a specific embodiment, the polymer material, or in other words the polymer matrix of the polymer composition, can comprise one or more olefin polymers and preferably one or more ethylene polymers. An olefin polymer is conventionally a polymer obtained from at least one olefin monomer.

More particularly, the polymer material comprises more than 30% by weight of olefin polymer(s), preferably more than 50% by weight of olefin polymer(s), preferably more than 70% by weight of olefin polymer(s) and particularly preferably more than 90% by weight of olefin polymer(s), with respect to the total weight of polymer material in the polymer composition. Preferably, the polymer material is composed solely of one or more olefin polymer(s).

By way of example, the polymer material of the invention can comprise one or more olefin polymers chosen from a linear low density polyethylene (LLDPE); a very low density polyethylene (VLDPE); a low density polyethylene (LDPE); a medium density polyethylene (MDPE); a high density polyethylene (HDPE); an ethylene-propylene elastomer copolymer (EPM); an ethylene-propylene-diene monomer terpolymer (EPDM); a copolymer of ethylene and of vinyl ester, such as a copolymer of ethylene and of vinyl acetate (EVA); a copolymer of ethylene and of acrylate, such as a copolymer of ethylene and of butyl acrylate (EBA) or a copolymer of ethylene and of methyl acrylate (EMA); a copolymer of ethylene and of α-olefin, such as a copolymer of ethylene and of octene (PEO) or a copolymer of ethylene and of butene (PEB); and one of their mixtures.

In a preferred embodiment, the polymer material comprises a copolymer of ethylene and of octene (PEO) and an ethylene-propylene-diene monomer terpolymer (EPDM). Preferably, the polymer material can comprise from 60 to 90% by weight of PEO and from 10 to 40% by weight of EPDM, with respect to the total weight of polymer material in the polymer composition.

The polymer composition of the invention can comprise at least 30% by weight of polymer material, preferably at least 50% by weight of polymer material and preferably at least 60% by weight of polymer material, with respect to the total weight of the polymer composition.

The Polymer Composition

The polymer composition of the invention is a crosslinkable composition.

It can advantageously be devoid of halogenated compounds and/or of silicone compounds and more particularly it can be devoid of halogenated polymers and/or of silicone polymers. Mention may be made, as silicone polymers, of polyorganosiloxanes.

The crosslinkable polymer composition is crosslinked by crosslinking processes well known to a person skilled in the art, such as, for example, peroxide crosslinking, crosslinking by an electron beam, silane crosslinking, crosslinking by ultraviolet radiation, and the like. Preferably, the preferred crosslinking in the context of the invention is peroxide crosslinking.

The polymer composition can comprise a sufficient amount of one or more crosslinking agents, in order to obtain said crosslinked layer.

The preferred process for crosslinking the polymer composition is peroxide crosslinking. On this account, the polymer composition can additionally comprise a crosslinking agent, in particular of the organic peroxide type.

By way of example, the polymer composition can comprise from 0.1 to 10.0 parts by weight of crosslinking agent per 100 parts by weight of polymer material and preferably from 1.0 to 7.0 parts by weight of crosslinking agent per 100 parts by weight of polymer material.

The polymer composition of the invention can additionally comprise a metal oxide, such as, for example, zinc oxide (ZnO). According to the type of polymer material used, the metal oxide can act as heat stabilizer and/or improve the electrical properties of the crosslinked layer.

The metal oxide can be added to the polymer composition in an amount which can range from 1.0 to 10.0 parts by weight of per 100 parts by weight of polymer material.

The polymer composition of the invention can additionally comprise one or more fillers.

The filler of the invention can be an inorganic or organic filler. It can be chosen from a flame-retardant filler and an inert filler (or noncombustible filler).

By way of example, the flame-retardant filler can be a hydrated filler chosen in particular from metal hydroxides, such as, for example, magnesium dihydroxide (MDH) or aluminum trihydroxide (ATH). These flame-retardant fillers act mainly by the physical route by decomposing endothermically (e.g., release of water), which has the consequence of lowering the temperature of the crosslinked layer and of limiting the propagation of the flames along the electric cable. The term "flame-retardant properties" is used in particular.

For its part, the inert filler (i.e., noncombustible filler) can be chalk, talc or clay (e.g., kaolin).

The filler can also be an electrically conducting filler chosen in particular from carbon-comprising fillers. Mention may be made, by way of example, as electrically conducting filler, of carbon blacks, graphenes or carbon nanotubes.

According to a first alternative form, the electrically conducting filler may be preferred in order to obtain a "semiconducting" crosslinked layer and may be introduced into the polymer composition in an amount sufficient to render the composition semiconducting, this amount varying according to the type of electrically conducting filler selected. By way of example, the appropriate amount of electrically conducting filler can be between 8 and 40% by weight in the polymer composition (with respect to the total weight of the polymer composition) for carbon black and can be from 0.1 to 5% by weight in the polymer composition (with respect to the total weight of the polymer composition) for carbon nanotubes.

According to a second alternative form, the electrically conducting filler may be preferred in order to obtain an "electrically insulating" crosslinked layer and may be used in a small amount in order to improve the dielectric properties of an electrically insulating layer, without it becoming semiconducting. In this case, the electrically conducting filler can also be used to color the layer and/or to the increase the stability of the layer to ultraviolet rays. By way of example, the appropriate amount of electrically conducting filler can be less than 8% by weight in the polymer composition and preferably at most 5% by weight in the polymer composition (with respect to the total weight of the polymer composition).

The polymer composition can comprise at least 1% by weight of filler(s), preferably at least 10% by weight of filler(s), and preferably at most 50% by weight of filler(s), with respect to the total weight of the polymer composition.

According to another characteristic of the invention and in order to guarantee a "Halogen-Free" or more particularly "Halogen-Free Flame Retardant" ("HFFR") electric cable, the electric cable, or in other words the components which make up said electric cable, preferably does/do not comprise halogenated compounds. These halogenated compounds can be of any nature, such as, for example, fluoropolymers or chloropolymers, such as polyvinyl chloride (PVC), polyvinylidene chloride, halogenated plasticizers, halogenated inorganic fillers, and the like.

The composition can typically additionally comprise additives well known to a person skilled in the art, in particular in an amount of 0.1 to 20% by weight in the polymer composition (with respect to the total weight of the polymer composition). Mention may be made, for example, of:

protective agents, such as antioxidants, UV stabilizers, agents for combating copper or agents for combating water treeing,
processing aids, such as plasticizers, lubricants, oils, waxes or paraffins,
compatibilizing agents,
coupling agents, such as silane-based compounds,
scorch retardants,
pigments,
crosslinking catalysts,
crosslinking coagents, such as triallyl cyanurates,
and one of their mixtures.

More particularly, the antioxidants make it possible to protect the composition from the thermal stresses brought about during the stages of manufacture of the electric cable or of operation of said cable.

The antioxidants are preferably chosen from:
sterically hindered phenolic antioxidants, such as tetrakis[methylene(3,5-di(t-butyl)-4-hydroxyhydro-cinnamate)]methane, octadecyl 3-(3,5-di(t-butyl)-4-hydroxyphenyl)propionate, 2,2'-thiodiethylenebis[3-(3,5-di(t-butyl)-4-hydroxyphenyl)propionate], 2,2'-thiobis(6-(t-butyl)-4-methylphenol), 2,2'-methylenebis(6-(t-butyl)-4-methylphenol), 1,2-bis(3,5-di(t-butyl)-4-hydroxyhydrocinnamoyl)hydrazine and 2,2'-oxamidodiethyl bis[3-(3,5-di(t-butyl)-4-hydroxyphenyl)propionate];
thioethers, such as 4,6-bis(octylthiomethyl)-o-cresol, bis[2-methyl-4-{3-(n-($C_{12}$ or $C_{14}$)alkylthio)-propionyloxy}-5-(t-butyl)phenyl] sulfide and thiobis[2-(t-butyl)-5-methyl-4,1-phenylene]bis[3-(dodecylthio)propionate];
sulfur-based antioxidants, such as dioctadecyl 3,3'-thiodipropionate or didodecyl 3,3'-thiodipropionate;
phosphorus-based antioxidants, such as phosphites or phosphonates, such as, for example, tris[2,4-di(t-butyl)phenyl] phosphite or bis[2,4-di(t-butyl)phenyl] pentaerythritol diphosphite; and
amine-type antioxidants, such as phenylenediamines (IPPD, 6PPD, and the like) and polymerized 2,2,4-trimethyl-1,2-dihydroquinoline (TMQ), the latter type of antioxidant being particularly preferred in the composition of the invention.

The TMQs can have different grades, namely:
a "standard" grade with a low degree of polymerization, that is to say with a residual monomer content of greater than 1% by weight and having a residual NaCl content which can range from 100 ppm to more than 800 ppm (parts per million by weight);
a "high degree of polymerization" grade with a high degree of polymerization, that is to say with a residual monomer content of less than 1% by weight and having a residual NaCl content which can range from 100 ppm to more than 800 ppm;
a "low content of residual salt" grade with a residual NaCl content of less than 100 ppm.

The type of stabilizing agent and its content in the composition of the invention are conventionally chosen according to the maximum temperature to which the polymers are subjected during the production of the mixture and during their processing, in particular by extrusion, and also according to the maximum duration of exposure to this temperature.

The purpose of the crosslinking catalysts is to help in the crosslinking, in particular for condensation reactions of the "silane" crosslinking type. The crosslinking catalyst can be chosen from Lewis acids, Brönsted acids and tin-based catalysts, such as, for example, dibutyltin dilaurate (DBTL).

In the present invention, the additives are preferably different from the diphenylamine derivative and from the sulfur-comprising compound of the polymer composition.

Example of Polymer Compositions According to the Invention, in Order to Obtain an Electrically Insulating Crosslinked Layer A crosslinkable polymer composition according to the invention of the electrically insulating type can comprise, in addition to the polymer material, the diphenylamine derivative and the sulfur-comprising compound, the following constituents:

from 1.0 to 10.0 parts by weight of zinc oxide per 100 parts by weight of polymer material,
from 30 to 100 parts by weight of inert filler(s) per 100 parts by weight of polymer material,
from 0.5 to 3.0 parts by weight of antioxidant(s) per 100 parts by weight of polymer material,
from 3.0 to 7.0 parts by weight of an organic peroxide per 100 parts by weight of polymer material,
from 2.0 to 15.0 parts by weight of processing aid(s) per 100 parts by weight of polymer material.

The Crosslinked Layer and the Electric Cable

In the present invention, the crosslinked layer is obtained by crosslinking processes well known to a person skilled in the art, such as those mentioned in the present description.

The crosslinking can be easily characterized by the determination of its gel content according to the standard ASTM D2765-01.

More particularly, said crosslinked layer can advantageously have a gel content, according to the standard ASTM D2765-01 (extraction with xylene), of at least 50%, preferably of at least 70%, preferably of at least 80% and particularly preferably of at least 90%.

In the present invention, the crosslinked layer of the invention can advantageously be a layer extruded along the cable by techniques well known to a person skilled in the art.

The crosslinked layer of the invention can be chosen from an electrically insulating layer, a semiconducting layer, a stuffing component and a protective sheath. In a particularly preferred embodiment, the crosslinked layer of the invention is an electrically insulating layer.

In the present invention, "electrically insulating layer" is understood to mean a layer, the electric conductivity of which can be at most $1.10^{-9}$ S/m (siemens per meter) (at 25° C.) and preferably at most $1.10^{-13}$ S/m (at 25° C.)

In the present invention, "semiconducting layer" is understood to mean a layer, the electrical conductivity of which can be at least $1.10^{-9}$ S/m (siemens per meter), preferably at least $1.10^{-3}$ S/m, and preferably can be less than $1.10^{3}$ S/m (at 25° C.)

When the crosslinked layer of the invention is a semiconducting layer, the polymer composition of the invention can comprise an electrically conducting filler in an amount sufficient to render the crosslinked layer of the invention semiconducting.

In the present invention, the crosslinked layer can surround one or more elongated electrical conductor(s), which is/are or is/are not insulated, along the cable.

According to a first alternative form, the crosslinked layer can be directly in physical contact with the elongated electrical conductor. Reference is made, in this first alternative form, to low-voltage cable.

According to a second alternative form, the crosslinked layer can be at least one of the layers of an insulating system comprising:

a first semiconducting layer surrounding the elongated electrical conductor,
an electrically insulating layer surrounding the first semiconducting layer, and
a second semiconducting layer surrounding the electrically insulating layer.

Reference is made, in this second alternative form, to medium- or high-voltage cable.

In this second alternative form, the crosslinked layer of the invention is preferably solely the electrically insulating layer.

In the present invention, the elongated electrical conductor can be in the central position (in cross section of the cable) in the cable.

The elongated electrical conductor can be a single-part conductor, such as, for example, a metal wire, or a multipart conductor, such as a plurality of metal wires which are or are not twisted.

The elongated electrical conductor can be produced from a metal material chosen in particular from aluminum, an aluminum alloy, copper, a copper alloy and one of their combinations.

Another subject matter of the invention is a process for the manufacture of an electric cable according to the invention, characterized in that it comprises the following stages:

i. extruding the polymer composition around an elongated electrical conductor, in order to obtain an extruded layer, and
ii. crosslinking the extruded layer of stage i.

Stage i can be carried out by techniques well known to a person skilled in the art, using an extruder.

During stage i, the composition at the extruder outlet is "noncrosslinked", the temperature and also the time of processing within the extruder being consequently optimized.

"Noncrosslinked" is understood to mean a layer, the gel content of which according to the standard ASTM D2765- (extraction with xylene) is at most 20%, preferably at most 10%, preferably at most 5% and particularly preferably 0%.

There is thus obtained, at the extruder outlet, a layer extruded around said elongated electrical conductor which may or may not be directly in physical contact with said elongated electrical conductor.

Prior to stage i, the constituent compounds of the polymer composition of the invention can be mixed, in particular with the polymer material in the molten state, in order to obtain a homogeneous mixture. The temperature within the mixer can be sufficient to obtain a polymer material in the molten state but is limited in order to prevent the crosslinking of the polymer material. The homogeneous mixture is then granulated by techniques well known to a person skilled in the art. These granules can subsequently feed an extruder in order to carry out stage i.

Of course, the types of processing in the invention are in no way limiting and can be adapted by a person skilled in the art according to the polymer material used, whether crystalline, noncrystalline or with a low degree of crystallinity, such as certain elastomers.

Stage ii can be carried out by the thermal route, for example using a continuous vulcanization line ("CV line"), a steam tube, a bath of molten salt, an oven or a thermal chamber, or else by irradiation, these techniques being well known to a person skilled in the art.

Stage ii thus makes it possible to obtain a crosslinked layer having in particular a gel content, according to the standard ASTM D2765-01, of at least 40%, preferably of at least 50%, preferably of at least 60% and particularly preferably of at least 70%.

At the extruder outlet, the polymer composition extruded in the form of a layer around the elongated electrical conductor can subsequently be subjected to a sufficient temperature for a sufficient time to be able to obtain the desired crosslinking. An extruded and crosslinked layer is then obtained.

Other characteristics and advantages of the present invention will become apparent in the light of the description of a nonlimiting example of an electric cable according to the invention, made with reference to the figures.

DETAILED DESCRIPTION

For reasons of clarity, only the components essential for the understanding of the invention have been represented diagrammatically, this not being done to scale.

Figure 1:
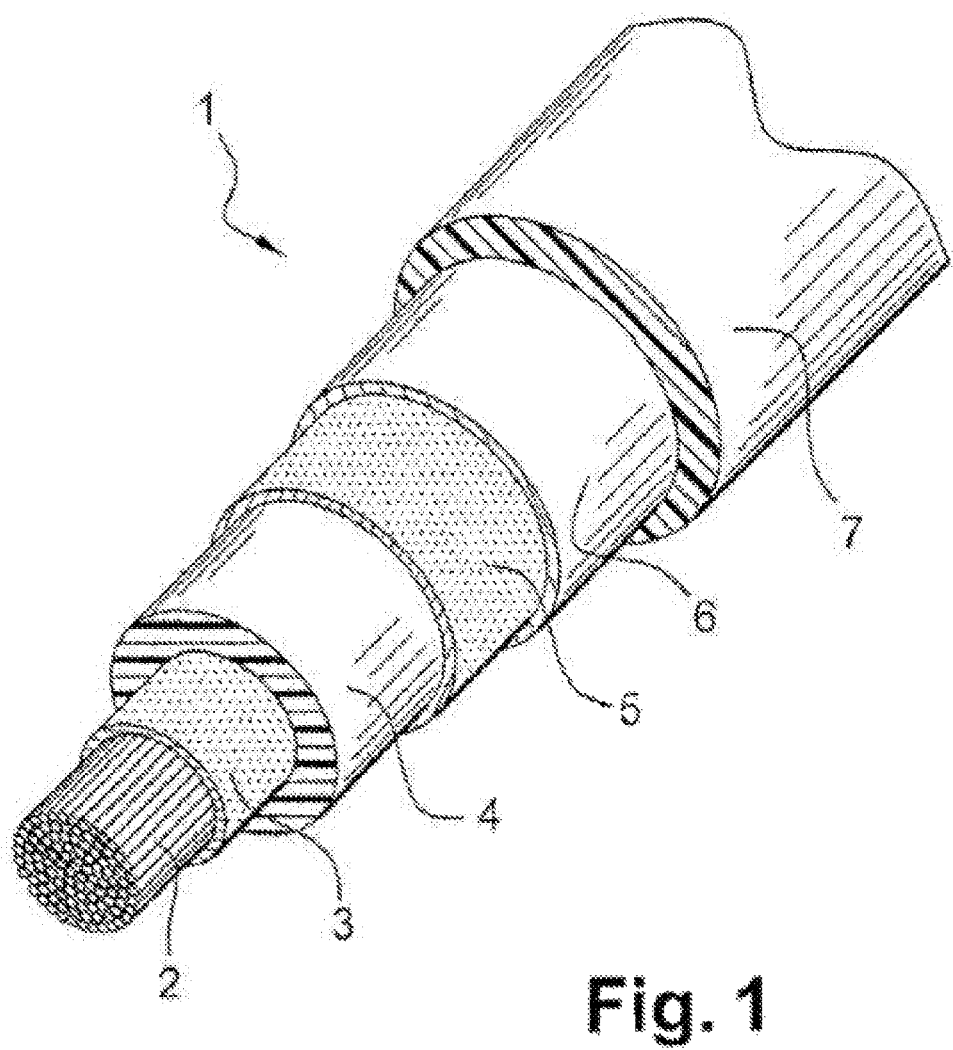
FIG. 1 represents a diagrammatic view in cross section of an electric cable according to a preferred embodiment in accordance with the invention.

The medium- or high-voltage power cable 1, illustrated in FIG. 1, comprises an elongated electrical conductor 2 in a central position, in particular made of copper or aluminum. The power cable 1 additionally comprises several layers positioned successively and coaxially around this electrical conductor 2, namely: a first semiconducting layer 3 referred to as "inner semiconducting layer", an electrically insulating layer 4, a second semiconducting layer 5 referred to as "outer semiconducting layer", an earthing and/or protective metal shield 6 and an external protective sheath 7.

The electrically insulating layer 4 is an extruded and crosslinked layer obtained from the polymer composition according to the invention.

The semiconducting layers are also extruded and crosslinked layers which may or may not be obtained from the polymer composition according to the invention.

The presence of the metal shield 6 and of the external protective sheath 7 is preferential but not essential, this cable structure being as such well known to a person skilled in the art.

Polymer compositions, the amounts of the compounds of which are expressed as parts by weight per 100 parts by weight of polymer material, are collated in table 1 below.

The polymer material in these polymer compositions comprises a mixture of two olefin polymers, namely a mixture of an EPDM and of a PEO.

Compositions C1 to C7 are comparative compositions, whereas composition C8 is in accordance with the invention.

TABLE 1

|  | C1 | C2 | C3 | C4 | C5 | C6 | C7 | C8 |
| --- | --- | --- | --- | --- | --- | --- | --- | --- |
| EPDM | 80.0 | 80.0 | 80.0 | 80.0 | 80.0 | 80.0 | 80.0 | 80.0 |
| PEO | 20.0 | 20.0 | 20.0 | 20.0 | 20.0 | 20.0 | 20.0 | 20.0 |
| Lead oxide | 0 | 5.0 | 0 | 0 | 0 | 0 | 0 | 0 |
| Diphenylamine derivative 1 | 0 | 0 | 1.5 | 0 | 0 | 0 | 1.5 | 1.5 |
| Diphenylamine derivative 2 | 0 | 0 | 0 | 1.5 | 0 | 0 | 0 | 0 |
| Organic thiol | 0 | 0 | 0 | 0 | 2.0 | 0 | 0 | 2.0 |
| Hindered amine | 0 | 0 | 0 | 0 | 0 | 2.0 | 0 | 0 |
| Zinc oxide 1 | 5.0 | 5.0 | 5.0 | 5.0 | 5.0 | 5.0 | 0 | 5.0 |
| Zinc oxide 2 | 0 | 0 | 0 | 0 | 0 | 0 | 5.0 | 0 |
| Crosslinking agent | 4.0 | 4.5 | 4.3 | 4.3 | 4.3 | 4.3 | 4.3 | 4.3 |
| Antioxidants | 2.0 | 2.0 | 2.0 | 2.0 | 2.0 | 2.0 | 2.0 | 2.0 |
| Inert filler | 75.0 | 75.0 | 75.0 | 75.0 | 75.0 | 75.0 | 75.0 | 75.0 |
| Processing aids | 10.0 | 10.0 | 10.0 | 10.0 | 10.0 | 10.0 | 10.0 | 10.0 |
| Coupling agent | 1.3 | 1.3 | 1.3 | 1.3 | 1.3 | 1.3 | 1.3 | 1.3 |
| Crosslinking coagent | 1.3 | 1.3 | 1.3 | 1.3 | 1.3 | 1.3 | 1.3 | 1.3 |

The origins of the compounds of table 1 are as follows:
EPDM is an ethylene-propylene-diene monomer terpolymer solid by Polimeri Europa under the reference Dutral CO 054;
POE is a copolymer of ethylene and of octene solid by ExxonMobil Chemicals under the reference Exact 8201;
Lead oxide is a protective system comprising $Pb_3O_4$ sold by OMYA sPa under the reference Multidisperse E RD 90 PE;
Diphenylamine derivative 1 is a protective system comprising octylated diphenylamine (ODPA) sold by Chemtura under the reference Octamine;
Diphenylamine derivative 2 is a protective system comprising styrenated diphenylamine (SDPA) sold by Lehmann & Voss & Co. under the reference Luvomaxx SDPA DL72 C;
Organic thiol is a protective system comprising 2-mercaptobenzimidazole (MBI) sold by RheinChemie under the reference Rhenogran MBI-80;
Hindered amine is a protective system sold by BASF under the reference Tinuvin 783 FDL;
Zinc oxide 1 is of the ZnO type sold by Silox under the reference Oxyde de zinc Silox 2 C;
Zinc oxide 2 is of the ZnO type of high purity sold by Umicore under the reference ZnO Pharma B;
Crosslinking agent comprising an organic peroxide sold by Akzo-Nobel under the reference Perkadox 14/40;
Antioxidants is an antioxidant of the TMQ type sold by Raschig under the reference Ralox TMQ;
Inert filler is kaolin sold by Imerys under the reference Kaolin Gebr. Polarite 503 S;
Processing aids is wax sold by Chemical Plus under the reference Paraffin Weiss 5413 Platten;
Coupling agent is a silane-based compound sold by Kettlitz under the reference Silanogran HVS;
Crosslinking coagent is of the triallyl cyanurate type sold by Kettlitz under the reference TAC GR 70.

The compositions collated in table 1 are processed as follows.

In a first step, for each composition (C1 to C8), the different constituents are mixed with the polymer material (EPDM+PEO) in an internal mixer at a temperature sufficient to render the mixture malleable and not exceeding 110° C.

In a second step, once the compositions have been mixed, 100×100 mm plaques are formed using a two-roll mixer inside which the mixed compositions pass.

Finally, said plaques are crosslinked in a Collin compression-molding device at a temperature of 180° C.

Water absorption and electrical permittivity tests were carried out on said plaques thus crosslinked obtained from compositions C1 to C8.

Figure 2:
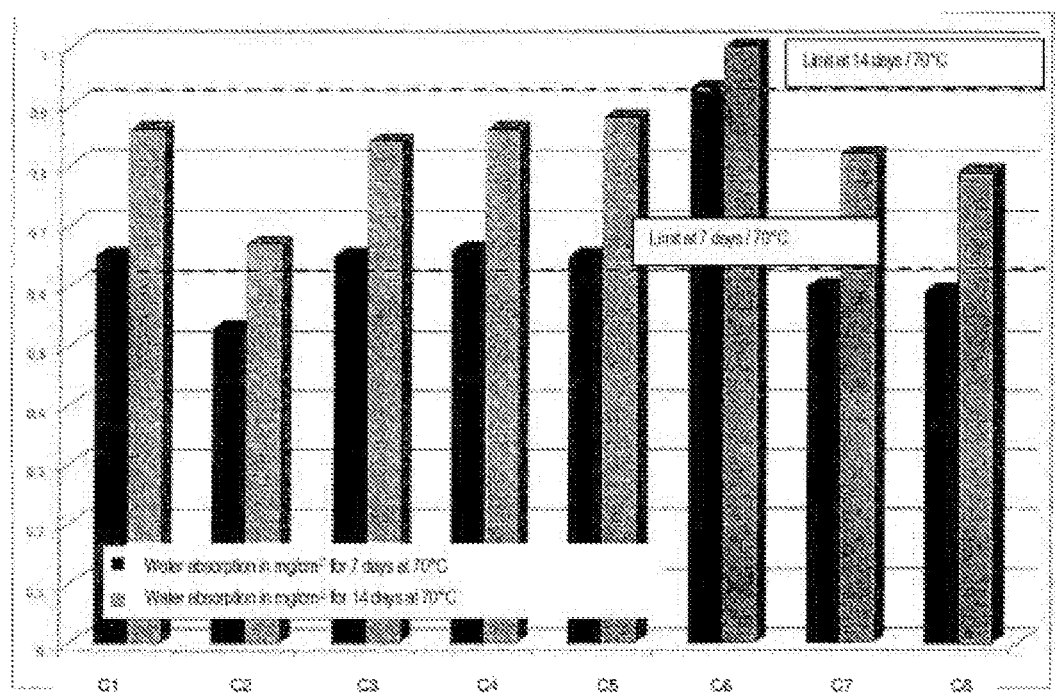
FIG. 2 represents a histogram of the water absorption results for different crosslinked layers.

More particularly, FIG. 2 represents a histogram of the water absorption results for the crosslinked layers C1 to C8 (i.e. crosslinked layers obtained from compositions C1 to C8). The water absorption tests were carried out on crosslinked layers, proportioned in the form of rectangular plaques having dimensions of 5 mm×10 mm with a thickness of 1.5 mm, by immersing them, on the one hand, in water at 70° C. for 7 days and, on the other hand, in water at 70° C. for 14 days. The results are given in mg/cm$^2$ by weighing, using a precision balance, the plaques before immersion and after immersion.

Figure 3:
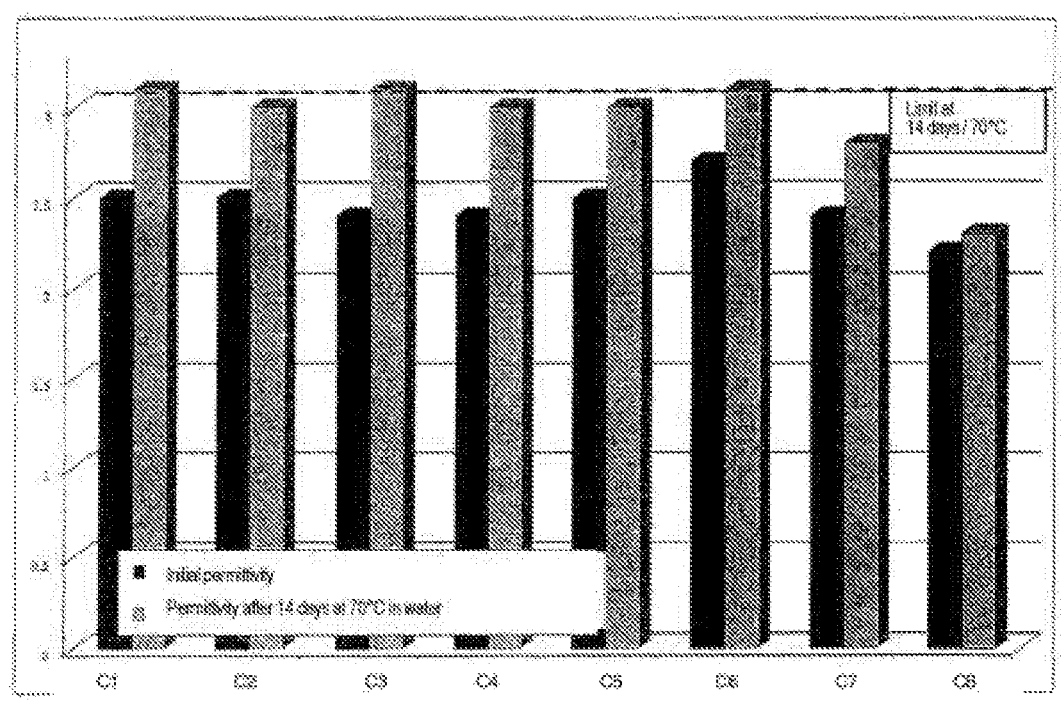
FIG. 3 represents a histogram of the permittivity results for different crosslinked layers.

FIG. 3 represents a histogram of the permittivity results for the crosslinked layers C1 to C8 (i.e., crosslinked layers obtained from compositions C1 to C8).

The electrical permittivity tests according to the standard IEC 250 were carried out at 90° C., on the one hand on extruded and crosslinked layers proportioned in the form of disks with a diameter of 50 mm and with a thickness of 1.5 mm, referred to as reference ones, and, on the other hand, on said disks after having been immersed in water at 70° C. for 14 days.

Only the crosslinked layer C8 of the invention simultaneously exhibits:
- a water absorption of less than 0.6 mg/cm$^2$ during immersion in water at 70° C. for 7 days,
- a water absorption of less than 0.8 mg/cm$^2$ during immersion in water at 70° C. for 14 days, and
- a permittivity at 90° C. of less than 2.5 after immersion in water at 70° C. for 14 days.

Consequently, the crosslinked layer of the invention exhibits very good mechanical and electrical properties, in particular a water absorption (i.e., swelling) and also a permittivity which are significantly limited.

The invention claimed is:

1. An electric cable comprising:
    an elongated electrical conductor surrounded by at least one crosslinked layer obtained from a polymer composition comprising a polymer material and a protective system, wherein said cable comprises a first semiconducting layer surrounding the elongated electrical conductor, an electrically insulating layer surrounding the first semiconducting layer and a second semiconducting layer surrounding the electrically insulating layer, the crosslinked layer being at least one of these three layers,
    wherein said protective system has:
        from 0.1 to 5.0 parts of diphenylamine or a diphenylamine derivative, per 100 parts by weight of polymer material, and
        from 0.1 to 5.0 parts by weight of a sulfur-comprising compound chosen from an organic thiol, a thiolate, and one of their mixtures, per 100 parts by weight of polymer material,
    wherein said sulfur-comprising compound is:
        (i) a sulfur-comprising compound of organic thiol type selected from 2-mercaptopyridine (MPY), 2-mercaptopyrimidine (MPM), 2-mercaptobenzimidazole (MBI), 2-mercaptobenzothiazaole (MBT), and their derivatives; 2,5-dimercapto-1,3,4-thiadiazole (DMT), 2-mercaptoethyl ether (DME), 2-mercaptoethyl sulfide (DMES) and their derivatives; trithiocyanuric acid (TT), 6-dibutylamino-1,3,5-triazinedithiol (DB), 6-anilino-1,3,5-triazinethiol (AF) and their derivatives; or
        (ii) a salt of one of said sulfur-comprising compound of organic thiol type; or
        (iii) a sulfur-comprising compound of the organic thiol and thiolate type selected from trithiocyanuric acid monosodium salt (TTN), 6-dibutylamino-1,3,5-triazinedithiol monosodium salt (DBN) and 6-anilino-1,3,5-triazinethiol monosodium salt (AFN); and
    wherein the polymer material includes
        a mixture of a copolymer of ethylene and of α-olefin and an ethylene-propylene elastomer copolymer (EPM); or
        a mixture of a copolymer of ethylene and of α-olefin and an ethylene-propylene-diene monomer terpolymer (EPDM), and
    wherein the copolymer of ethylene and of α-olefin is a copolymer of ethylene and octene (PEO) or a copolymer of ethylene and of butene (PEB).

2. The cable as claimed in claim 1, wherein the diphenylamine derivative is chosen from octylated diphenylamine (ODPA), styrenated diphenylamine (SDPA) and one of their mixtures.

3. The cable as claimed in claim 1, wherein the sulfur-comprising compound is an organic monothiol.

4. The cable as claimed in claim 1, the sulfur-comprising compound is a benzimidazole derivative.

5. The cable as claimed in claim 1, wherein the sulfur-comprising compound is chosen from mercaptobenzimidazoles and their derivatives.

6. The cable as claimed in claim 5, wherein the mercaptobenzimidazoles or their derivatives are chosen from 2-mercaptobenzimidazole (MBI), the methylated derivatives of 2-mercaptobenzimidazole (MMBI) and one of their mixtures.

7. The cable as claimed in claim 1, wherein the polymer material comprises more than 30% by weight of olefin polymer(s), with respect to the total weight of polymer material in the polymer composition.

8. The cable as claimed in claim 1, wherein the polymer material comprises a copolymer of ethylene and of octene (PEO) and an ethylene-propylene-diene monomer terpolymer (EPDM).

9. The cable as claimed in claim 8, wherein the polymer material comprises from 60 to 90% by weight of PEO and from 10 to 40% by weight of EPDM, with respect to the total weight of the polymer material in the polymer composition.

10. The cable as claimed in claim 1, wherein the polymer composition comprises from 1.0 to 10.0 parts by weight of metal oxide per 100 parts by weight of polymer material.

11. The cable as claimed in claim 1, wherein the polymer composition additionally comprises a crosslinking agent.

12. The cable as claimed in claim 11, wherein the crosslinking agent is an organic peroxide.

13. The cable as claimed in claim 1, wherein the polymer composition comprises less than 3% by weight of lead oxide, with respect to the total weight of the polymer composition.

14. The cable as claimed in claim 1, wherein the polymer composition comprises more than 30% by weight of polymer material, with respect to the total weight of the polymer composition.

15. The cable as claimed in claim 1, wherein the polymer composition does not comprise halogenated polymer.

16. The cable as claimed in claim 1, wherein the polymer composition does not comprise polyorganosiloxane.

17. The cable as claimed in claim 1, wherein the crosslinked layer is an extruded layer.

18. The cable as claimed in claim 1, wherein the crosslinked layer is a layer directly in physical contact with the elongated electrical conductor.

19. The cable as claimed in claim 1, wherein the crosslinked layer is said electrically insulating layer.

20. A process for the manufacture of a cable as claimed in claim 1, wherein said process comprises the following stages:
   i. extruding the polymer composition around an elongated electrical conductor, in order to obtain an extruded layer, and
   ii. crosslinking the extruded layer of stage i.

21. The cable as claimed in claim 1, wherein said polymer composition further comprises an inert filler i-s selected among chalk, talc and clay.

22. The cable as claimed in claim 1, wherein said polymer composition further comprises a metal oxide.

23. The cable as claimed in claim 22, wherein the metal oxide is zinc oxide (ZnO).

24. An electric cable according to claim 1, wherein the combined amounts and types of (1) diphenylamine or a diphenylamine derivative,
   (2) sulfur-comprising compound chosen from an organic thiol, a thiolate, and one of their mixtures, and
   (3) polymer material results in a crosslinked layer that has a water absorption of at most 0.9 mg/cm$^2$ during immersion in water at 70° C. for 14 days.

25. An electric cable according to claim 1, wherein the crosslinked layer further comprises from 30 to 100 parts by weight of inert filler(s) per 100 parts by weight of polymer material.

26. An electric cable according to claim 1, wherein said polymer composition further comprises an antioxidant different from the protective system compounds.

* * * * *